(12) United States Patent
VanBlon et al.

(10) Patent No.: US 10,114,671 B2
(45) Date of Patent: Oct. 30, 2018

(54) INTERRUPTING A DEVICE BASED ON SENSOR INPUT

(71) Applicant: LENOVO (Singapore) PTE. LTD., New Tech Park (SG)

(72) Inventors: Russell Speight VanBlon, Raleigh, NC (US); Robert James Kapinos, Durham, NC (US); Timothy Winthrop Kingsbury, Cary, NC (US); Scott Wentao Li, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 122 days.

(21) Appl. No.: 15/237,422

(22) Filed: Aug. 15, 2016

(65) Prior Publication Data

US 2018/0046495 A1 Feb. 15, 2018

(51) Int. Cl.
*G06F 9/46* (2006.01)
*G06F 15/00* (2006.01)
*G10L 15/00* (2013.01)
*G10L 21/00* (2013.01)
*G06F 9/48* (2006.01)

(52) U.S. Cl.
CPC ................ *G06F 9/4812* (2013.01)

(58) Field of Classification Search
None
See application file for complete search history.

(56) References Cited

PUBLICATIONS

Isbitski; An Introduction to the Alexa Skills Kit (ASK); Archive.org; Sep. 5, 2015.*
Detwiler; Amazon Echo teardown gets inside the smart speaker powered by the cloud; Cnet; Sep. 14, 2015.*
Combs; Amazon Echo is ZSiri in a Pringle(r) can; stevencombs. com; Feb. 21, 2015.*
Nguyen; 21 Amazon Echo Tips You Should Definitely Know About; Buzzfeed; Aug. 1, 2016.*
Alexa Voice Service; REST API for Alexa Voice Service; Archive. org Sep. 7, 2015.*

* cited by examiner

*Primary Examiner* — Bing Zhao
(74) *Attorney, Agent, or Firm* — Kunzler, PC (57) ABSTRACT

Apparatuses, methods, systems, and program products are disclosed for interrupting a device. A method includes detecting, by use of a processor, an interrupt cue in response to input received from the one or more sensors. The method further includes determining one or more actively executing applications on an information handling device. The method also includes interrupting the one or more actively executing applications in response to the interrupt cue.

15 Claims, 5 Drawing Sheets

INTERRUPTING A DEVICE BASED ON SENSOR INPUT

FIELD

The subject matter disclosed herein relates to device interruption and more particularly relates to interrupting applications on a device in response to a cue.

BACKGROUND

Communicating or interacting with someone using a device may be difficult because the user can become fully immersed when using the device. Attempting to get the user's attention often amounts to asking the user the same question numerous time, yelling at the user, poking or tapping the user, or the like.

BRIEF SUMMARY

An apparatus for device interruption is disclosed. A method and computer program product also perform the functions of the apparatus. The apparatus, in one embodiment, includes one or more sensors, a processor, and a memory that stores code executable by the processor. In some embodiments, the code is executable by the processor to detect an interrupt cue in response to input received from the one or more sensors. In a further embodiment, the code is executable by the processor to determine one or more actively executing applications on an information handling device. In various embodiments, the code is executable by the processor to interrupt the one or more actively executing applications in response to the interrupt cue.

In one embodiment, the interrupt cue comprises a voice cue. In some embodiments, the voice cue comprises a predefined voice command. In a further embodiment, the voice cue is detected in response to recognizing an individual providing the voice cue. In various embodiments, the voice cue is detected in response to one of a tone and a volume of the voice cue satisfying a predefined threshold.

In some embodiments, the interrupt cue comprises recognizing one or more characteristics of an individual within a predetermined proximity of the information handling device. In one embodiment, the interrupt cue further comprises determining that the individual has a predefined relationship to a user of the device. In certain embodiments, the code is executable by the processor to resume the one or more interrupted applications in response to a resume cue.

In one embodiment, the resume cue is selected from the group consisting of detecting an end to a conversation between an individual and a user of the information handling device, expiration of a predetermined amount of time after detecting a voice, detecting a predefined resume phrase, and receiving input on the information handling device to resume the one or more interrupted applications.

In some embodiments, the interrupt is selected from the group consisting of pausing an active application, pausing content presented by the active application, adjusting a volume, powering the information handling device off, turning an electronic display of the information handling device off, presenting a notification, and closing an active application.

In one embodiment, an active application of the one or more active applications is interrupted in response to being an interruptible application associated with the detected interrupt cue. In various embodiments, the code is executable by the processor to suppress notifications received at the information handling device for an interrupted application.

A method, in one embodiment, includes detecting, by use of a processor, an interrupt cue in response to input received from the one or more sensors. The method, in a further embodiment, includes determining one or more actively executing applications on an information handling device. The method, in some embodiments, includes interrupting the one or more actively executing applications in response to the interrupt cue.

In some embodiments, the interrupt cue is a voice cue comprising a predefined voice command. In a further embodiment, the method includes detecting the voice cue in response to one or more of recognizing an individual providing the voice cue and one of a tone and a volume of the voice cue satisfying a predefined threshold. In some embodiments, the interrupt cue comprises recognizing one or more characteristics of an individual within a predetermined proximity of the information handling device.

In one embodiment, the method includes resuming the one or more interrupted applications in response to a resume cue. The resume cue is selected form the group consisting of detecting an end to a conversation between an individual and a user of the information handling device, expiration of a predetermined amount of time after detecting a voice, detecting a predefined resume phrase, and receiving input on the information handling device to resume the one or more interrupted applications.

In some embodiments, the interrupt is selected from the group consisting of pausing an active application, pausing content presented by the active application, adjusting a volume, powering the information handling device off, turning an electronic display of the information handling device off, dimming the display, presenting a notification, and closing an active application. In various embodiments, the active application of the one or more active applications is interrupted in response to being an interruptible application associated with the detected interrupt cue.

A program product, one embodiment, includes a computer readable storage medium that stores code executable by a processor. In various embodiments, the executable code includes code to perform detecting an interrupt cue in response to input received from the one or more sensors. In some embodiments, the executable code includes code to perform determining one or more actively executing applications on an information handling device. In a further embodiment, the executable code includes code to perform interrupting the one or more actively executing applications in response to the interrupt cue.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
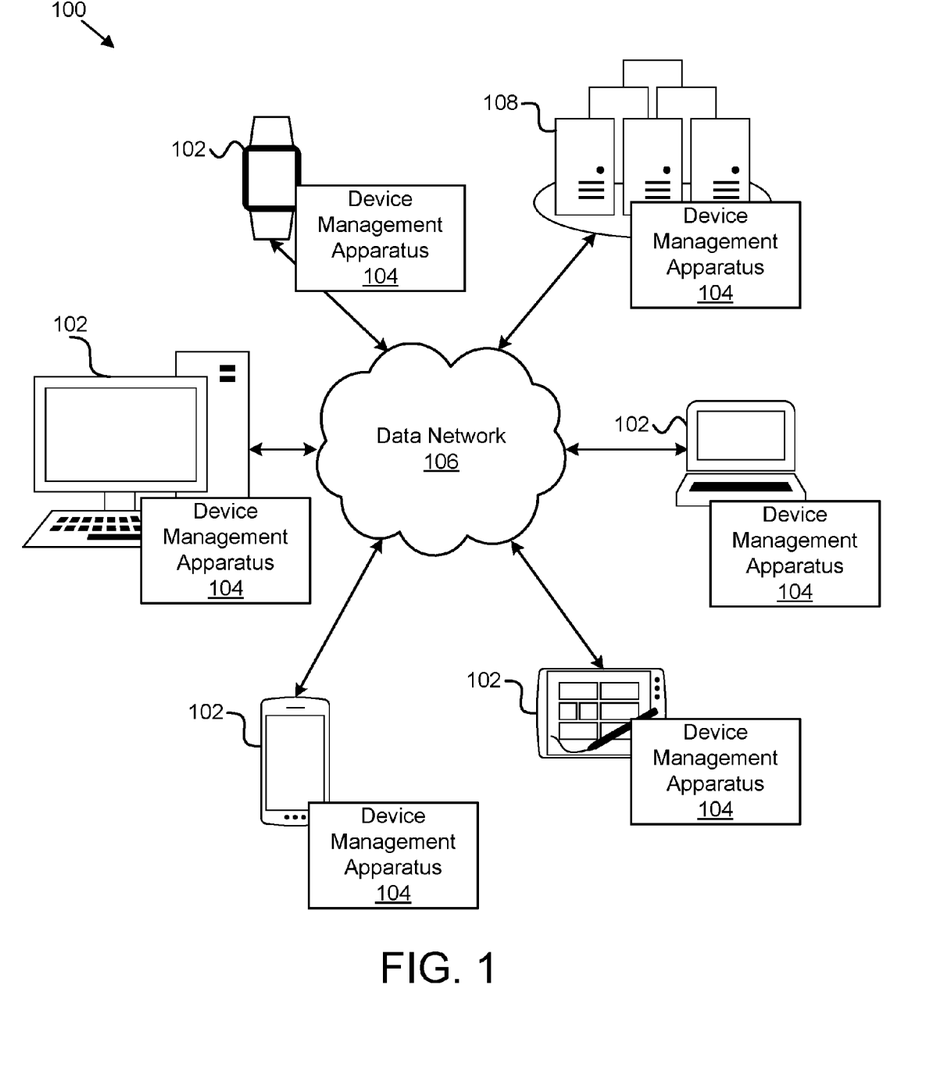
FIG. 1 is a schematic block diagram illustrating one embodiment of a system for device interruption.

FIG. 1 is a schematic block diagram illustrating one embodiment of a system 100 for interrupting a device. In one embodiment, the system 100 includes one or more information handling devices 102, one or more device management apparatuses 104, one or more data networks 106, and one or more servers 108. In certain embodiments, even though a specific number of information handling devices 102, device management apparatuses 104, data networks 106, and servers 108 are depicted in FIG. 1, one of skill in the art will recognize, in light of this disclosure, that any number of information handling devices 102, device management apparatuses 104, data networks 106, and servers 108 may be included in the system 100 for interrupting a device.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may be electrically coupled to a display to present content such as television content, movie content, game content, internet content, or the like. Similarly, the information handling devices 102 may be electrically coupled to a speaker for presenting audio sounds, which may be associated with content presented on a display.

In one embodiment, the device management apparatus 104 is configured to interrupt a device (e.g., video and/or audio content playing on the device, games executing on the device, and/or the like) in response to a cue. The device management apparatus 104, in one embodiment, is configured to detect an interrupt cue in response to input received from one or more sensors. The device management apparatus 104, in a further embodiment, is configured to determine one or more actively executing applications on an information handling device 102. The device management apparatus 104, in some embodiments, is configured to interrupt the one or more actively executing applications in response to the interrupt cue. The device management apparatus 104, including its various sub-modules, may be located on one or more information handling devices 102 in the system 100, one or more servers 108, one or more network devices, and/or the like. The device management apparatus 104 is described in more detail below with reference to FIGS. 2 and 3.

In one embodiment, the device management apparatus 104 improves the functionality and/or usability of the computer, computing technology, computing environment, or the like, by automatically interrupting one or more applications executing on a device in response to an interrupt cue, e.g., an individual speaking to the user of the device, an individual entering a room where the device is being used, or the like. In this manner, the user of the device may give an individual his/her full attention without being distracted with content, applications, sounds, games, or the like that are being consumed by the user on the user's device.

In various embodiments, the device management apparatus 104 may be embodied as a hardware appliance that can be installed or deployed on an information handling device 102, on a server 108, or elsewhere on the data network 106. In certain embodiments, the device management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the device management apparatus 104 may include a power interface, a wired and/or wireless network interface, a graphical interface that attaches to a display, and/or a semiconductor integrated circuit device as described below, configured to perform the functions described herein with regard to the device management apparatus 104.

The device management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the device management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the device management apparatus 104.

The semiconductor integrated circuit device or other hardware appliance of the device management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the device management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. For example, a server 108 may store data associated with one or more interrupt cues, may perform voice or facial recognition processing, and/or the like.

Figure 2:
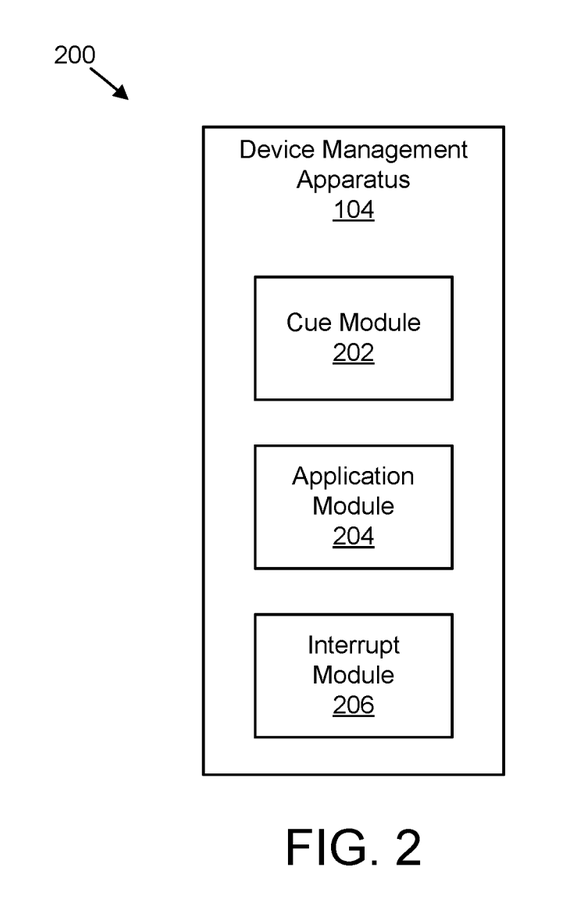
FIG. 2 is a schematic block diagram illustrating one embodiment of an apparatus for device interruption.

FIG. 2 is a schematic block diagram illustrating one embodiment of an apparatus 200 for interrupting a device. In one embodiment, the apparatus 200 includes an embodiment of a device management apparatus 104. The device management apparatus 104, in some embodiments, includes one or more of a cue module 202, an application module 204, and an interrupt module 206, which are described in more detail below.

The cue module 202, in one embodiment, detects an interrupt cue in response to input received from one or more sensors. The sensors may be integrated with, electrically coupled to, or otherwise in communication with a device. The sensors may include a microphone, a digital camera, an infrared camera, a proximity sensor, a motion sensor, eye tracking sensors (e.g., Microsoft Hololens®), wireless signal sensors (e.g., Bluetooth®, NFC, or the like), and/or the like.

An interrupt cue, as used herein, may include any type of trigger detected by a sensor associated with the device intended to interrupt one or more applications that are actively executing on the device. An actively executing application, as used herein, may include an application that a user is currently interacting with, using, watching, listening to, consuming, or the like. Similarly, an actively executing application may include an application that is currently presenting content (e.g., video, audio, games, or the like), an application that has focus to receive input, and/or the like. For example, an actively executing application may include a game application, a television application, a music application, an Internet browser, a spreadsheet application, a word processing application, and/or the like.

An interrupt cue, in one embodiment, may include a voice cue that the cue module 202 is configured to detect based on input received from a microphone, or other sensor (e.g., a camera that is configured to detect and recognize what an individual is saying by processing movements of the individual's mouth). The voice cue may include a predefined voice command. For example, the cue module 202 may detect an individual saying "Excuse me," "What's up," "Hello," "Hey," or the like, which the cue module 202 may detect as a predefined voice command.

The cue module 202, in certain embodiments, may register, be trained, or may learn different voice commands. For example, a user may register the voice command "Pardon" as an interrupt cue so that when the cue module 202 detects an individual saying "Pardon," the cue module 202 will interpret it is an interrupt cue. The cue module 202 may receive one or more voice recordings of a user speaking an intended voice command and store the recorded voice command for future reference. For example, the cue module 202 may analyze and store the sound characteristics or a signature of the voice command that can be used to compare to sound characteristics or signatures of voice commands given at a later time.

In one embodiment, the cue module 202 analyzes a given voice command provided by an individual during a registration mode to determine the voice command's sound characteristics and/or signature such that when the individual speaks the voice command at a later time, the cue module 202 can receive sound data representing the provided voice command from the microphone, and compare its signature with signatures of stored voice commands to determine whether the individual that previously registered the voice command is the individual that is currently providing the voice command.

In such an embodiment, the cue module 202 associates a predefined voice command with a particular individual. In a further example, the cue module 202 may recognize a provided voice command as an interrupt cue in response to determining that an individual speaking the voice command is the individual associated with the previously registered voice command. For example, a father may register the voice command "Pause" with his child's tablet computer, such that when the father says "Pause" the cue module 202 may compare the voice command provided by the father with a previously stored voice command, and if the previously stored and currently provided voice commands match, the cue module 202 may interpret the voice command as an interrupt cue. Thus, if another person speaks the voice command "Pause," such as a sibling or friend that is not registered as a user associated with the voice command "Pause," the cue module 202 may not interpret the voice command as an interrupt cue.

In one embodiment, the cue module 202 detects a voice cue or voice command in response to a tone of the voice cue and/or a volume of the voice cue satisfying a predetermined threshold. For example, the cue module 202 may differentiate between a voice command give in a normal or conversational tone of voice, and one given in an annoyed, angry, questioning, or the like tone of voice, which may be represented by various tone threshold. Such a differentiation may be based on a comparison of the provided voice command with stored or registered signatures of voice commands provided with different tones. Similarly, the cue module 202 may detect a voice command if the volume of the voice command satisfies a threshold volume. For example, if the volume of the provided voice command exceeds a predefined conversational volume threshold (e.g., 70 dB).

In some embodiments, the cue module 202 uses image data, or similar data, of an individual captured using a camera electrically coupled to a device to determine an identity of an individual that may be giving the voice command. For example, the cue module 202 may perform facial recognition processing to determine facial data of an individual in the image and compare the facial data against a database of facial data for registered faces to determine an identity of an individual providing the voice command. In another embodiment, the cue module 202 may compare a wireless signature of a device associated with an individual with a registered wireless signature to determine the identity of the individual. For example, the cue module 202 may receive a MAC address from a wearable activity tracker, a smart phone, or the like associated with the individual, and may compare the received MAC address with a previously stored MAC address associated with the individual. If the cue module 202 determines that the individual's identity matches a stored entity, and that the individual's identity is associated with a provided voice command, the cue module 202 may interpret the voice command as an interrupt cue.

In one embodiment, the cue module 202 detects an interrupt cue in response to an individual being within a predefined proximity of a device. In certain embodiments, the cue module 202 uses input received from proximity sensors, motion sensors, wireless signal detectors (e.g., to detect proximity of a user's smart phone or other wireless device), or the like to determine whether an individual is within a predefined proximity of a device. For example, the cue module 202 may determine that an individual is within a foot of a device, and may interpret the individual's proximity to the device as an interrupt cue to interrupt the device.

In certain embodiments, the cue module 202 determines whether the detected individual is an individual that has been previously registered, stored, or the like as an individual that may interrupt the device. For example, a mother may register herself as an individual that can interrupt a child's device when she is within three feet of the device. In such an embodiment, the cue module 202 may register the mother by detecting one or more characteristics of the mother, such as her height, weight, hair style (e.g., length, color, or the like), facial features (e.g., eye size/shape, nose size/shape, mouth size/shape, or the like), tattoos, arm length, or the like. Accordingly, when the mother is within a predefined proximity of the device, the cue module 202 may use input from proximity or motion sensors to determine one or more characteristics of the mother, compare those characteristics with one or more stored characteristics for different individuals to determine whether the mother is an individual authorized to interrupt the device based on her proximity, and interprets the mother's proximity to the device as an interrupt cue.

Furthermore, in one embodiment, the cue module 202 detects an interrupt cue in response to determining that a detected individual has a predefined relationship to the user of the device. For example, if the cue module 202 determines that a child's father, mother, guardian, or the like is within a predefined proximity of the device, is providing a voice command to interrupt the device, or the like, the cue module 202 may interpret the presence of the individual, the voice command provided by the individual, or the like, as an interrupt cue. In such an embodiment, an individual may register with the device as an individual that has a predefined relationship to the user of the device, such as a parent or guardian, a grandparent, an uncle or aunt, a friend, a babysitter, a teacher, a coach, or the like.

The application module 204, in one embodiment, determines one or more actively executing application on a device. As explained above, the one or more actively executing applications may include an application that a user is currently interacting with, using, watching, listening to, consuming, or the like. Similarly, an actively executing application may include an application that is currently presenting content (e.g., video, audio, games, or the like), an application that has focus to receive input, and/or the like. For example, an actively executing application may include a game application, a television application, a music application, an Internet browser, a spreadsheet application, a word processing application, and/or the like.

The application module 204 may reference a list, table, or the like of applications that are currently processing on the device to determine which applications are actively executing. Similarly, the application module 204 may reference a list, table, or the like of applications that currently have focus or are otherwise actively being used by a user, and not just executing in the background, for example.

The interrupt module 206, in one embodiment, interrupts the one or more actively executing applications in response to the interrupt cue. By interrupting the actively executing applications, the interrupt module 206 prevents a user from getting distracted when an individual is trying to speak to the user or otherwise get the user's attention.

In one embodiment, the interrupt includes pausing playback of content presented in an application, such as pausing a video playing in a video player or web browser, a game, a music player, or the like. In some embodiments, the interrupt includes pausing execution of an application, e.g., suspending the application and executing the application as a background process. In a further embodiment, the interrupt includes adjusting a volume of an application, e.g., decreasing or muting a volume of an application producing sound.

In one embodiment, the interrupt includes powering the device off, e.g., turning off a smart phone, tablet computer, or the like. In certain embodiments, the interrupt includes powering off an electronic display of a device, e.g., blanking or disabling a device's screen. In some embodiments, the interrupt includes presenting a screen saver or other background image to hide the display of any active applications. In one embodiment, the interrupt includes closing one or more active applications, e.g., the interrupt module 206 may save a state of each active application and then exit them. In various embodiments, the interrupt may include presenting a notification to the user that an individual is trying to get their attention. The interrupt module 206 may use any of the foregoing interruptions individually or in combination, which may be dependent on the characteristics of the application (e.g., it may be less processor intensive and cumbersome to mute the volume of a music player rather than exiting the music player).

The interrupt module 206, in some embodiments, determines whether an actively executing application is an interruptible application. In certain embodiments, some applications may not be interruptible, such as a program streaming live television that is not connected to or transmitted through a digital video recorder, an online multiplayer game, or the like.

In various embodiments, an active application is interruptible in response to a predefined voice command, as described above, which may be assigned to or otherwise associated with the active application. For example, a video application may be interruptible in response to the cue module 202 detecting the voice command "Hey," but not in response to a different voice command. In this manner, the interrupt cue can be set on a per-application basis and/or on a per-device basis such that a predefined voice command interrupts each active application executing on the device.

Similarly, in one embodiment, a user may specify which programs, or which content (e.g., TV shows, movies, news programs, or the like) should be interrupted in response to an interrupt cue. For example, a husband may configure his TV or set-top box to pause a football game on TV when his wife speaks a voice command or enters a room, but not a romance movie. Or, similarly, a user may configure his device to show a distracting background color/overlay when an application like Facebook is active, but use a less distracting method for a work-related application. A user may configure the interrupt module 206 to not interrupt any applications, to interrupt all applications, to interrupt specified applications, to interrupt certain features of an application (e.g., sounds, videos, music, or the like), and/or the like.

Figure 3:
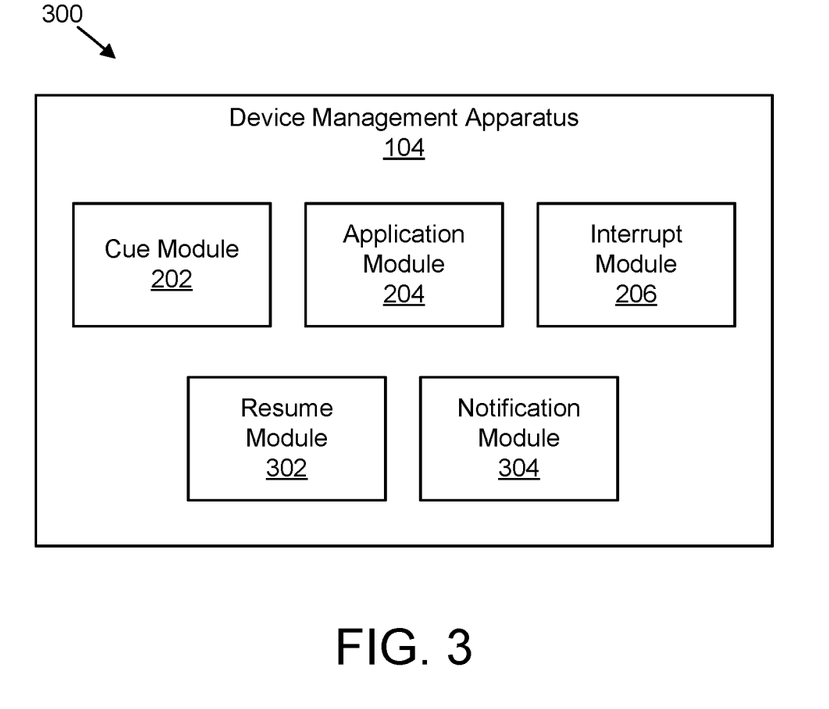
FIG. 3 is a schematic block diagram illustrating one embodiment of another apparatus for device interruption.

FIG. 3 is a schematic block diagram illustrating one embodiment of an apparatus 300 for interrupting a device. In one embodiment, the apparatus 300 includes an embodiment of a device management apparatus 104. The device management apparatus 104, in some embodiments, includes one or more of a cue module 202, an application module 204, and an interrupt module 206, which may be substantially similar to the cue module 202, the application module 204, and the interrupt module 206 described above. The device management apparatus 104, in one embodiment, includes one or more of a resume module 302 and a notification module 304, which are described in more detail below.

The resume module 302, in one embodiment, resumes one or more interrupted applications in response to a resume cue. In one embodiment, the resume cue may include a predefined resume phrase. Similar to the interrupt cue described above, the resume module 302 may detect a predefined voice command as a resume cue, such as "Goodbye," "See ya," "Resume," "Continue," or the like.

As with the interrupt cue, the resume module 302 may detect a resume cue based on the individual that provides the resume command, phrase, sentence, or the like. For example, the resume module 302 may compare a sound signature of the provided resume command with one or more stored sound signatures to determine whether the individual providing resume cue is registered as an authorized individual to resume interruption of the active applications. For example, a father may be the only individual registered with a child's tablet computer to resume interruption of the applications executing on the tablet by providing a predefined resume cue.

In a further embodiment, the resume module 302 detects a resume cue by detecting an end to a conversation between an individual and a user of the device. For example, the resume module 302 may monitor for conversation-ending phrases or words, such as "Goodbye," "See you later," or the like; may detect an individual turn away from the user, or the like. In a further embodiment, the resume module 302 detects an individual moving away from the device so that it he is outside of an interruption proximity of the device. For example, the resume module 302 may interpret an individual moving away from the device, further than a predefined threshold from the device, as an indication that the conversation between the user and the individual is done.

In a further embodiment, the resume module 302 detects a resume cue by determining that a predetermined amount of time has expired after detecting an individual or a user's voice, which may indicate the end of a conversation between the user and the individual. For example, the resume module 302 may detect a resume cue after 10 seconds, 20 seconds, 30 seconds, or the like has passed without detecting an individual or a user speak.

The resume module 302, in some embodiments, detects a resume cue in response to a user manually resuming the active applications. For example, the resume module 302 may receive input from a user in response to a prompt given to the user to confirm resuming the active applications. In some embodiments, the resume module 302 detects a resume cue in response to a user pressing one or more physical buttons on a device, one or more virtual buttons, performing a gesture on a touch screen, and/or the like.

The notification module 304, in one embodiment, suppresses notifications received at the device for an interrupted application. For example, the notification module 304 may not display a notification until the application is resumed, may mute sounds indicating a received notification, may delay presenting a notification or playing sounds or other indications of a received message until an application is resumed, and/or the like.

Figure 4:
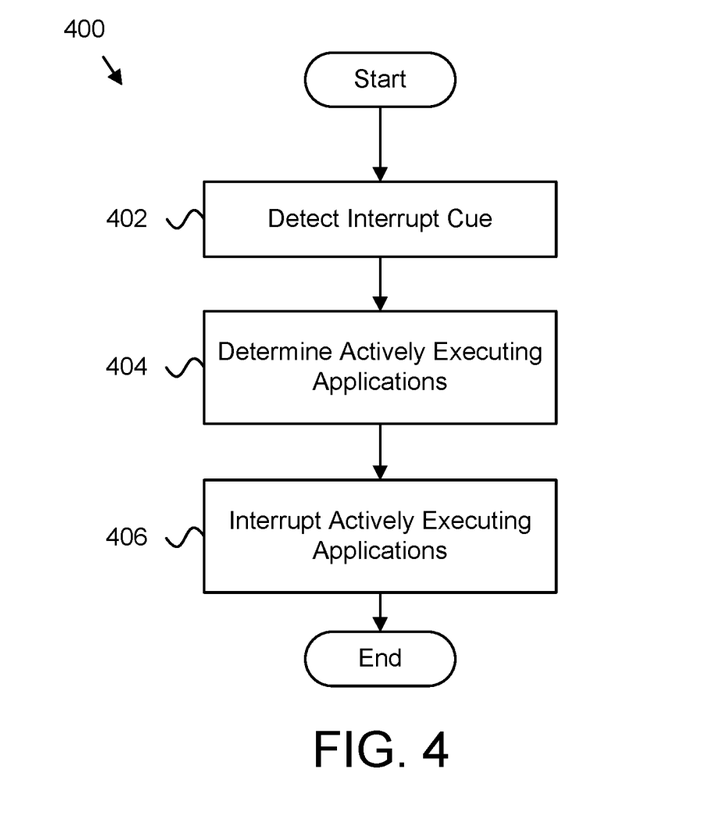
FIG. 4 is a schematic flow chart diagram illustrating one embodiment of a method for device interruption.

FIG. 4 is a schematic flow chart diagram illustrating one embodiment of a method 400 for interrupting a device. In one embodiment, the method 400 begins and the cue module 402 detects 402 an interrupt cue in response to input received from the one or more sensors. In a further embodiment, the application module 204 determines 404 one or more actively executing applications on a device. In certain embodiments, the interrupt module 206 interrupts 406 the one or more actively executing applications in response to the interrupt cue, and the method 400 ends.

Figure 5:
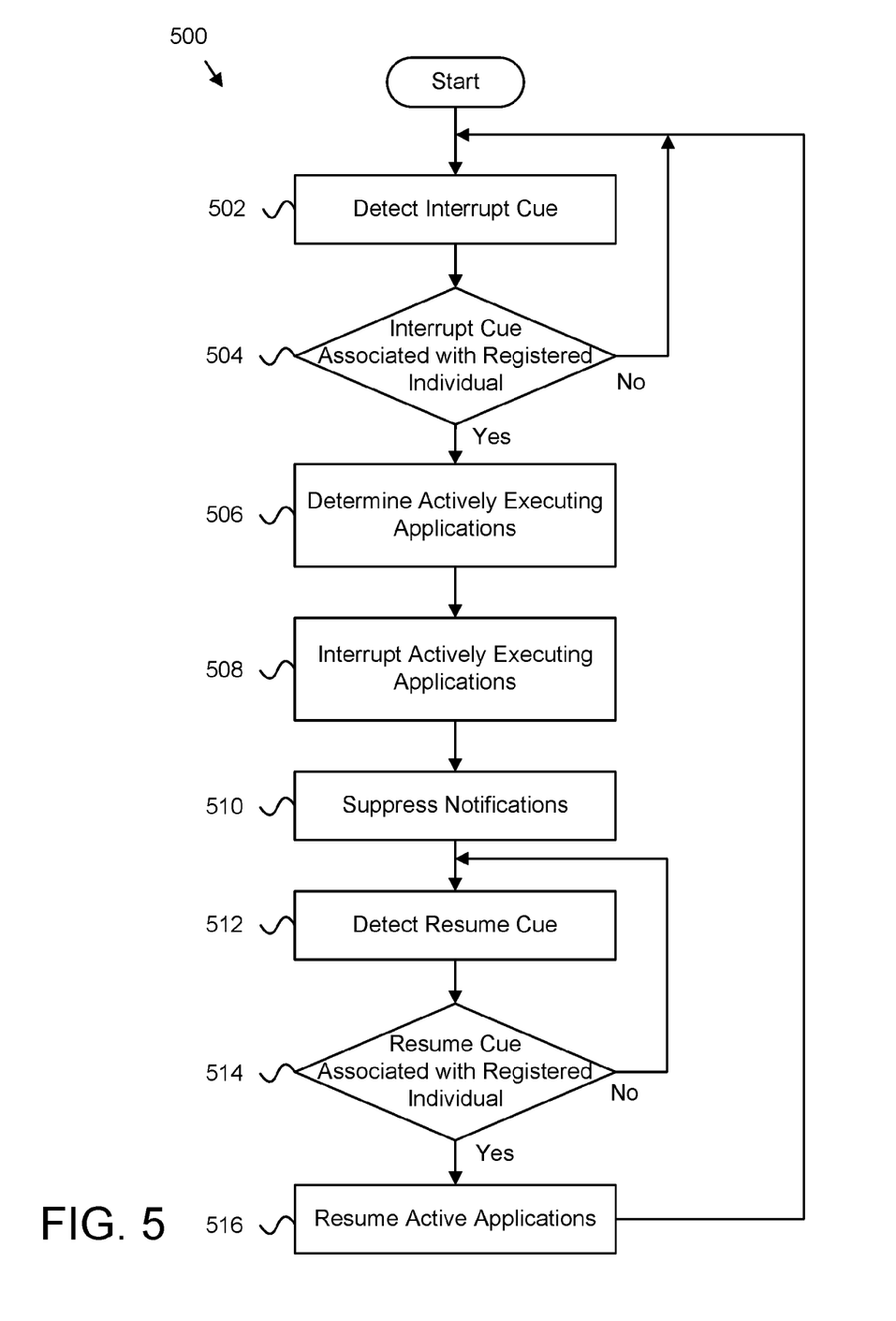
FIG. 5 is a schematic flow chart diagram illustrating one embodiment of another method for device interruption.

FIG. 5 is a schematic flow chart diagram illustrating one embodiment of a method 500 for interrupting a device. In one embodiment, the method 500 begins and the cue module 202 detects 502 an interrupt cue in response to input received from the one or more sensors. In some embodiments, the cue module 202 determines 502 whether the interrupt cue is associated with a registered individual (e.g., based on voice/speech recognition, facial recognition, or the like). If not, then the method 500 continues to monitor and detect 502 interrupt cues.

Otherwise, in various embodiments, if the cue module 202 determines 504 that the detected interrupt cue is associated with a registered individual, the application module 204 determines 506 one or more actively executing applications on a device. The interrupt module 206, in one embodiment, interrupts 508 the one or more actively executing applications in response to the interrupt cue.

In a further embodiment, the notification module 304 suppresses 510 received notifications associated with the one or more interrupted applications by, for example, hiding a notification on a display, muting a sound associated with the notification, or the like. In a further embodiment, the resume module 306 detects 512 a resume cue to resume the one or more interrupted applications.

The resume module 306 may determine 514 whether the resume cue is associated with a registered individual authorized to resume the interrupted active applications. If not, the resume module 302 continues to monitor and detect 512 resume cues. Otherwise, the resume module 302 resumes 512 the one or more interrupted applications, and the cue module 202 continues to monitor and detect 502 interrupt cues to interrupt one or more active applications on the device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an information handling device comprising one or more sensors, the information handling device in use by a first individual;
   a processor of the information handling device; and
   a memory that stores code executable by the processor to:
      detect an interrupt cue from a second individual in response to input received from the one or more sensors, the interrupt cue comprising a voice command;
      determine an identity of the second individual based on one or more characteristics of the second individual as determined by the input received from the one or more sensors, the one or more characteristics comprising one or more of a visual characteristic of the second individual and a wireless signal of the second individual;
      determine that the second individual has a predefined relationship to the first individual;
      determine one or more actively executing applications that the first user is using on the information handling device; and
      interrupt the one or more actively executing applications that the first individual is using in response to the interrupt cue, determining that the voice command is associated with the determined identity of the second individual, and determining that the second individual has a predefined relationship to the first individual.

2. The apparatus of claim 1, wherein the voice cue is detected in response to one of a tone and a volume of the voice cue satisfying a predefined threshold.

3. The apparatus of claim 1, wherein the interrupt cue further comprises detecting that the second individual is within a predetermined proximity of the information handling device.

4. The apparatus of claim 1, wherein the code is further executable by the processor to resume the one or more interrupted applications in response to a resume cue.

5. The apparatus of claim 4, wherein the resume cue is selected from the group consisting of:
   detecting an end to a conversation between the second individual and the first individual;
   expiration of a predetermined amount of time after detecting a voice;
   detecting a predefined resume phrase; and
   receiving input on the information handling device to resume the one or more interrupted applications.

6. The apparatus of claim 1, wherein the interrupt is selected from the group consisting of pausing an active application, pausing content presented by the active application, adjusting a volume, powering the information handling device off, turning an electronic display of the information handling device off, presenting a notification, and closing an active application.

7. The apparatus of claim 1, wherein an active application of the one or more active applications is interrupted in response to being an interruptible application associated with the detected interrupt cue.

8. The apparatus of claim 1, wherein the code is further executable by the processor to suppress notifications received at the information handling device for an interrupted application.

9. A method comprising:
   detecting, by use of a processor, an interrupt cue from a second individual in response to input received from the one or more sensors of an information handling device in use by a first user, the interrupt cue comprising a voice command;

determining an identity of the second individual based on one or more characteristics of the second individual as determined by the input received from the one or more sensors, the one or more characteristics comprising one or more of a visual characteristic of the second individual and a wireless signal of the second individual;

determining that the second individual has a predefined relationship to the first individual;

determining one or more actively executing applications that the first user is using on the information handling device; and interrupting the one or more actively executing applications that the first individual is using in response to the interrupt cue, determining that the voice command is associated with the determined identity of the second individual, and determining that the second individual has a predefined relationship to the first individual.

10. The method of claim 9, further comprising detecting the voice command in response to one of a tone and a volume of the voice command satisfying a predefined threshold.

11. The method of claim 9, wherein the interrupt cue further comprises detecting that the second individual is within a predetermined proximity of the information handling device.

12. The method of claim 9, further comprising resuming the one or more interrupted applications in response to a resume cue, the resume cue selected from the group consisting of:

detecting an end to a conversation between the second individual and the first individual;

expiration of a predetermined amount of time after detecting a voice;

detecting a predefined resume phrase; and receiving input on the information handling device to resume the one or more interrupted applications.

13. The method of claim 9, wherein the interrupt is selected from the group consisting of pausing an active application, pausing content presented by the active application, adjusting a volume, powering the information handling device off, turning an electronic display of the information handling device off, presenting a notification, and closing an active application.

14. The method of claim 9, wherein an active application of the one or more active applications is interrupted in response to being an interruptible application associated with the detected interrupt cue.

15. A program product comprising a computer readable storage medium that is not a transitory signal and that stores code executable by a processor, the executable code comprising code to perform:

detecting an interrupt cue from a second individual in response to input received from the one or more sensors of an information handling device in use by a first user, the interrupt cue comprising a voice command;

determining an identity of the second individual based on one or more characteristics of the second individual as determined by the input received from the one or more sensors, the one or more characteristics comprising one or more of a visual characteristic of the second individual and a wireless signal of the second individual;

determining that the second individual has a predefined relationship to the first individual;

determining one or more actively executing applications that the first user is using on the information handling device; and interrupting the one or more actively executing applications that the first individual is using in response to the interrupt cue, determining that the voice command is associated with the determined identity of the second individual, and determining that the second individual has a predefined relationship to the first individual.

* * * * *